(12) United States Patent
Park et al.

(10) Patent No.: US 9,365,752 B2
(45) Date of Patent: Jun. 14, 2016

(54) ADHESIVE COMPOSITION

(71) Applicant: LG CHEM, LTD., Seoul (KR)

(72) Inventors: In Kyu Park, Daejeon (KR); No Ma Kim, Daejeon (KR); In Ho Hwang, Gyeonggi-do (KR); Min Joon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/249,044

(22) Filed: Apr. 9, 2014

(65) Prior Publication Data

US 2014/0220264 A1 Aug. 7, 2014

Related U.S. Application Data

(63) Continuation of application No. PCT/KR2012/011316, filed on Dec. 21, 2012.

(30) Foreign Application Priority Data

Dec. 21, 2011 (KR) .................. 10-2011-0138978
Dec. 21, 2012 (KR) .................. 10-2012-0151110

(51) Int. Cl.

| | | |
|---|---|---|
| *C09K 19/00* | (2006.01) | |
| *C09J 133/14* | (2006.01) | |
| *C09J 7/02* | (2006.01) | |
| *C08G 18/67* | (2006.01) | |
| *C08G 18/75* | (2006.01) | |
| *C09D 175/04* | (2006.01) | |
| *C09J 133/04* | (2006.01) | |
| *C09J 175/04* | (2006.01) | |
| *C08G 18/62* | (2006.01) | |
| *C08G 18/79* | (2006.01) | |
| *C09J 133/06* | (2006.01) | |

(52) U.S. Cl.
CPC ............ *C09J 133/14* (2013.01); *C08G 18/6229* (2013.01); *C08G 18/672* (2013.01); *C08G 18/755* (2013.01); *C08G 18/792* (2013.01); *C09D 175/04* (2013.01); *C09J 7/0246* (2013.01); *C09J 133/04* (2013.01); *C09J 133/066* (2013.01); *C09J 175/04* (2013.01); *C08G 2170/40* (2013.01); *C08L 2312/00* (2013.01); *C09J 2203/318* (2013.01); *C09J 2433/00* (2013.01); *C09J 2467/006* (2013.01); *G02F 2202/22* (2013.01); *G02F 2202/28* (2013.01); *Y10T 428/1082* (2015.01); *Y10T 428/2891* (2015.01); *Y10T 428/31935* (2015.04)

(58) Field of Classification Search
CPC ........... C08G 18/6229; C08G 2170/40; C08G 7/0246; C09J 7/0217; C09J 7/0246; C09J 133/066; C09J 133/08; C09J 133/10; B32B 7/12; G02F 2202/28; Y10T 428/1059; Y10T 428/1077; Y10T 428/1082; Y10T 428/2891
USPC ................. 428/1.5, 1.54, 1.55, 345, 355 AC; 264/496; 526/320, 318.42, 319, 323.1, 526/324, 325, 329.6
See application file for complete search history.

(56) References Cited

U.S. PATENT DOCUMENTS

| | | | |
|---|---|---|---|
| 2008/0311395 A1* | 12/2008 | Ukei et al. ..................... | 428/354 |
| 2011/0007244 A1* | 1/2011 | Kim et al. ...................... | 349/96 |
| 2011/0187970 A1 | 8/2011 | Kim et al. | |

FOREIGN PATENT DOCUMENTS

| | | | |
|---|---|---|---|
| EP | 1 927 871 A1 | | 4/2008 |
| JP | 2005-008830 A | | 1/2005 |
| JP | 2005-206776 A | | 8/2005 |
| JP | 2008-174738 A | | 7/2008 |
| JP | 2008-248223 A | | 10/2008 |
| JP | 2008248223 A | * | 10/2008 |
| JP | 2009-298916 A | | 12/2009 |
| KR | 10-2011-0007373 A | | 1/2011 |

* cited by examiner

*Primary Examiner* — Ruiyun Zhang
(74) *Attorney, Agent, or Firm* — Dentons US LLP

(57) ABSTRACT

Provided are a pressure sensitive adhesive composition, a protective film, an optical film and a display device. The pressure sensitive adhesive composition shows appropriate low-speed and high-speed peel strengths after formation of a cross-linked structure, and has a superior balance between the two. Accordingly, when the pressure sensitive adhesive composition is applied to a protective film, for example, a superior protection effect as well as easy peel-off upon high-speed peeling, which is advantageous for a high-speed process, are shown, and in addition, a superior antistatic property may be obtained during the process.

13 Claims, No Drawings

ADHESIVE COMPOSITION

TECHNICAL FIELD

The present application relates to a pressure sensitive adhesive composition, a protective film for an optical film, an optical film and a display device.

BACKGROUND ART

A protective film may be used to prevent an attachment of debris such as dusts or generation of scratches in optical films, such as a polarizing plate, other plastic products, home appliances, or automobiles. Proper peel strength and an antistatic property are required in the protective film.

For instance, relatively low peel strength is required when peeling the protective film off at a high speed (hereinafter, "high-speed peel strength") in order to use the product or assemble other products. On the other hand, the peel strength upon peeling off at a low speed (hereinafter, "low-speed peel strength") may be relatively high so that it can exhibit a proper protection function.

In addition, the static electricity mainly generated upon peeling the protective film may induce an influx of impurities, such as dust, or electrostatic destruction or malfunction of a device in the case of electronic products. Especially, issues caused by static electricity are becoming more severe as more computers are supplied and as the appliances are further integrated by multi-functionalization of liquid crystal TVs or mobile phones.

As such, efforts to impart an antistatic function to an adhesive contained in the protective film are ongoing.

For example, suppression of static electricity generation was attempted by combining an adhesive with an ethylene oxide-modified dioctyl phthalate plasticizer in Patent Literature 1. Addition of an organic salt to an adhesive was attempted in Patent Literature 2, and a metal salt and a chelating agent were combined in an adhesive in Patent Literature 3. However, according to these methods, contamination occurs by a transfer of adhesive components to the product to be protected, or suppression of static electricity generated in early stage is difficult, and particularly the low-speed peel strength which is important for the protection function becomes too low.

RELATED ART DOCUMENTS

Patent Literatures

[Patent Literature 1] Japanese Patent Publ. No. 1993-140519
[Patent Literature 2] Korean Patent Publ. No. 2004-0030919
[Patent Literature 3] Korean Patent Publ. No. 2006-0128659

DISCLOSURE

Technical Problem

The present application provides a pressure sensitive adhesive composition, a protective film for an optical film, an optical film and a display device.

Technical Solution

One illustrative pressure sensitive adhesive composition may include a polymer and a cross-linking agent. The polymer may have cross-linking points, and a cross-linked structure may be realized by a cross-linking reaction with the cross-linking agent.

As for the polymer, all of the various known types which may be used for the preparation of adhesive, such as an acrylic copolymer, may be used. For instance, the polymer can include at least two different kinds of monomers having a hydroxyl group. For example, the monomer may be contained in the polymer by being polymerized.

As examples of the monomer, the polymer can include the monomer represented by the following Chemical Formula 1 below, in which a total number of carbon atoms in A and B is less than 3, for instance, the total number is at least 1 and less than 3 (hereinafter, "first monomer"), and the monomer represented by the following Chemical Formula 1, in which a total number of carbon atoms in A and B is at least 3, for instance, the total number is 3 to 20, 3 to 16, 3 to 12, 3 to 8, 3 to 6, 4 to 20, 4 to 16, 4 to 12, 4 to 8 or 4 to 6 (hereinafter, "second monomer").

[Chemical Formula 1]

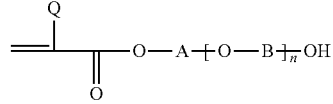

In Chemical Formula 1, Q is hydrogen or an alkyl group, A and B are each independently an alkylene group or an alkylidene group, and n is an arbitrary number, for instance, a number from 0 to 10.

In Chemical Formula 1, when there are at least two [—O—B—] units in Chemical Formula 1, the number of carbon atoms of B in the unit may be the same or different.

In the present specification, the term "alkyl group" may denote an alkyl group having 1 to 20 carbon atoms, 1 to 16 carbon atoms, 1 to 12 carbon atoms, 1 to 8 carbon atoms, or 1 to 4 carbon atoms unless particularly defined otherwise. The alkyl group may be a straight chain, a branched chain or a cyclic form. The alkyl group may be substituted by at least one substituent, or unsubstituted.

In the present specification, the term "alkylene group" or "alkylidene group" may denote an alkylene group or alkylidene group having 1 to 20 carbon atoms, 1 to 16 carbon atoms, 1 to 12 carbon atoms, 1 to 8 carbon atoms, or 1 to 4 carbon atoms unless particularly defined otherwise. The alkylene group or alkylidene group may be a straight chain, a branched chain or a cyclic form. The alkylene group or alkylidene group may be substituted by at least one substituent as necessary.

A and B in Chemical Formula 1 may be, for instance, each independently a straight chain alkylene group.

In the present specification, examples of the substituents to particular functional groups, such as the alkyl group, alkylidene group or alkylene group, include an alkyl group, an alkoxy group, an alkenyl group, an epoxy group, a cyano group, a carboxyl group, an acryloyl group, a methacryloyl group, an acryloyloxy group, a methacryloyloxy group and an aryl group, but the present application is not limited thereto.

Examples of the compound of Chemical Formula 1 include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate and 2-hydroxypropyleneglycol (meth)acrylate, but the present application is not limited thereto.

The polymer can, for example, satisfy General Formula 1 below.

$$1 \leq O/P \leq 10 \quad \text{[General Formula 1]}$$

In General Formula 1, O is a weight % of the first monomer contained in the polymer, and P is a weight % of the second monomer contained in the polymer.

In another embodiment, O/P in General Formula 1 may be about 1 to 8 or about 1 to 7.

The adhesive having a superior balance between high-speed and low-speed peel strengths and a superior antistatic property enabling an effective formation of the polymer may be provided when the ratio of the first and second monomers contained in the polymer is controlled to satisfy General Formula 1. For example, 0.1 to 10 parts by weight of the first monomer and 0.1 to 10 parts by weight of the second monomer may be contained in the polymer while the ratio of the monomers satisfies General Formula 1.

In the present specification, a unit "parts by weight" denotes a weight ratio between components, unless particularly defined otherwise.

The polymer may further include a compound having an alkylene oxide chain. The compound may be, for example, contained in the polymer by being polymerized. The compound of Chemical Formula 2 below may be an example of the compound having an alkylene oxide chain.

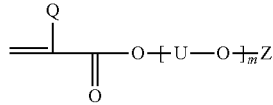

[Chemical Formula 2]

In Chemical Formula 2, Q is hydrogen or an alkyl group, U is an alkylene group or an alkylidene group, Z is an alkyl group or an aryl group, and m is an arbitrary number, for example, a number from 1 to 20.

When there are at least two [—U—O-] units in Chemical Formula 2, the number of carbon atoms of U in the unit may be the same or different.

m in Chemical Formula 2 may be, for example, 1 to 16, 1 to 12, 4 to 16, 4 to 12, 4 to 10 or 4 to 8. When the polymer is prepared in the above range, appropriate conductivity may be imparted to the adhesive, while keeping polymerization efficiency and crystallinity of the polymer within the proper range.

In another embodiment, Q in Chemical Formula 2 may be an alkyl group, such as an alkyl group having 1 to 8 carbon atoms or 1 to 4 carbon atoms. When the compound in which Q is an alkyl group is used, the protective film may be advantageously removed easily without causing any residue or stain in the adherent, for example, when the pressure sensitive adhesive composition is applied to the protective film.

In the present specification, the term "aryl group" may denote a monovalent moiety derived from the compound or its derivatives including a benzene or a structure formed by condensation or bonding of at least two benzenes unless particularly defined otherwise. The aryl group may be, for example, an aryl group having 6 to 22 carbon atoms, 6 to 16 carbon atoms or 6 to 13 carbon atoms. Examples of the aryl group include a phenyl group, a phenylethyl group, a phenylpropyl group, a benzyl group, a tolyl group, a xylyl group and a naphthyl group.

Examples of the compound having Chemical Formula 2 include one or at least two of an alkoxy dialkyleneglycol (meth)acrylic acid ester, an alkoxy trialkyleneglycol (meth) acrylic acid ester, an alkoxy tetraalkyleneglycol (meth)acrylic acid ester, an aryloxy dialkyleneglycol (meth)acrylic acid ester, an aryloxy trialkyleneglycol (meth)acrylic acid ester and an aryloxy tetraalkyleneglycol (meth)acrylic acid ester, but the present application is not limited thereto.

Examples of the alkoxy in the above include, for example, an alkoxy group having 1 to 20 carbon atoms, 1 to 16 carbon atoms, 1 to 12 carbon atoms or 1 to 4 carbon atoms, particularly a methoxy group or an ethoxy group.

Also, examples of the alkyleneglycol in the above include an alkyleneglycol having 1 to 20 carbon atoms, 1 to 16 carbon atoms, 1 to 12 carbon atoms or 1 to 4 carbon atoms, for instance, which may be ethyleneglycol or propyleneglycol. Examples of the aryloxy in the above include an aryloxy having 6 to 24 carbon atoms or 6 to 12 carbon atoms, for example, phenoxy.

When the compound of Chemical Formula 2 is contained, the polymer can satisfy General Formula 2 and/or 3 below.

$$O+P \leq X \quad \text{[General Formula 2]}$$

$$1 \text{ weight } \% \leq O+P+X \leq 30 \text{ weight } \% \quad \text{[General Formula 3]}$$

In General Formulae 2 and 3, O and P are as defined in General Formula 1, and X is a weight % of the compound of Chemical Formula 2 contained in the polymer.

In a further embodiment, the sum of O, P and X (O+P+X) in General Formula 3 may be about 1 weight % to 25 weight % or about 5 weight % to 25 weight %.

For example, the compound of Chemical Formula 2 may be contained in an amount of 1 to 20 parts by weight, while controlling the ratio to satisfy General Formula 2 and/or 3. The parts by weight may be, for example, the parts by weight relative to 100 parts by weight of the total monomers contained in the polymer.

The polymer can further include a (meth)acrylic acid ester monomer, such as an alkyl (meth)acrylate. The monomer may be contained in the polymer, for example, by being polymerized.

As for the alkyl (meth)acrylate, an alkyl (meth)acrylate having an alkyl group having 1 to 14 carbon atoms may be used, in view of cohesion, glass transition temperature or adhesion of the adhesive. Examples of such a monomer include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, isononyl (meth)acrylate, lauryl (meth)acrylate and tetradecyl (meth)acrylate, of which one or at least two may be contained in the polymer as a polymerization unit.

The (meth)acrylic acid ester monomer may be, for example, contained in an amount of 75 to 95 parts by weight in the polymer, which may be modified as necessary. For example, the first and second monomers and the compound of Chemical Formula 2 may be contained in the polymer in the ratio which satisfies General Formula 1, 2 and/or 3 as necessary, and the remaining components may be the (meth)acrylic acid ester monomer and/or a known monomer which will be explained below.

The polymer can, as necessary, further include a monomer known for preparation of a polymer for an adhesive, for example, a carboxyl-group-containing monomer, such as (meth)acrylic acid, 2-(meth)acryloyloxy acetic acid, 3-(meth)acryloyloxy propionic acid, 4-(meth)acryloyloxy butyric acid, acrylic acid dimer, itaconic acid, maleic acid and maleic acid anhydride; or an isocyanate-containing monomer, a glycidyl-containing monomer, such as glycidyl (meth)

acrylate, or a nitrogen-containing radical polymerizable monomer such as (meth)acrylamide, N-vinyl pyrrolidone or N-vinyl caprolactam, or a radical polymerizable monomer, such as styrene. The monomers may be contained in the polymer by being polymerized, for example, in an amount of about 20 parts by weight or less.

The polymer may be manufactured by selecting required monomers among the above-described monomers, and applying polymerization methods, such as solution polymerization, photo polymerization, bulk polymerization, suspension polymerization or emulsion polymerization, in the mixture in which the selected monomers are combined in the target ratio.

The pressure sensitive adhesive composition may include a cross-linking agent which can react with the cross-linking points of the polymer to realize a cross-linked structure.

An aliphatic isocyanate cross-linking agent is used as the cross-linking agent. The adhesive having appropriate low-speed and high-speed peel strengths as well as the required antistatic property may be realized when the cross-linking agent realizes the cross-linked structure along with the polymer, i.e. the polymer including at least two monomers having a hydroxyl group.

For example, a cross-linking agent including an aliphatic cyclic isocyanate compound and/or an aliphatic acyclic isocyanate compound may be used as the cross-linking agent. The term "aliphatic cyclic isocyanate compound" above may denote an isocyanate compound including a cyclic structure which is not an aromatic cyclic structure, and an aliphatic acyclic isocyanate compound may denote, for example, an aliphatic straight or branched isocyanate compound. In the above, examples of the aliphatic cyclic isocyanate compound include isocyanate compounds, such as isophorone diisocyanate or methylene dicyclohexyl diisocyanate or cyclohexane diisocyanate, its derivatives, such as its dimer or trimer, or the reaction product of any one of the above with a polyol (e.g. trimethylolpropane), and examples of the aliphatic acyclic isocyanate compound include alkylene diisocyanate compounds having 1 to 20 carbon atoms, 1 to 16 carbon atoms, 1 to 12 carbon atoms or 1 to 8 carbon atoms, such as hexamethylene diisocyanate, its derivatives, such as its dimer or trimer, or the reaction product of any one of the above with a polyol (e.g. trimethylolpropane), but the present application is not limited thereto.

When the aliphatic cyclic isocyanate compound and the aliphatic acyclic isocyanate compound are used together as above, the ratio thereof is not particularly limited, and may be selected appropriately as necessary. Generally, 1 to 500 parts by weight or 20 to 300 parts by weight of the aliphatic acyclic isocyanate compound may be contained in the cross-linking agent relative to 100 parts by weight of the aliphatic cyclic isocyanate compound. Such cross-linking agent, i.e. the cross-linking agent including both an aliphatic cyclic isocyanate compound and an aliphatic acyclic isocyanate compound, may be one commercially available, and examples thereof include MHG-80B and Duranate P available from Asahi and NZ-1 available from BAYER.

If necessary, the cross-linking agent may be used with, in addition to the above, known cross-linking agents, such as epoxy cross-linking agents, such as ethyleneglycol diglycidylether, triglycidylether, trimethylol propane triglycidylether, N,N,N',N'-tetraglycidyl ethylenediamine or glycerine diglycidylether; and aziridine cross-linking agents, such as N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) or tri-1-aziridinylphosphineoxide, or metal chelate cross-linking agents, such as a compound in which a multivalent metal such as aluminum, iron, zinc, tin, titanium, antimony, magnesium and/or vanadium is coordinated with acetyl acetone or ethyl acetoacetic acid.

The pressure sensitive adhesive composition can include the cross-linking agent in an amount of 0.01 to 10 parts by weight or 0.01 to 5 parts by weight relative to 100 parts by weight of the polymer. In the above range, the appropriate cross-linked structure may be realized and the low-speed and high-speed peel strengths of the adhesive may be controlled to the target range.

The pressure sensitive adhesive composition may further include an antistatic agent. For example, an ionic compound may be used as the antistatic agent.

For instance, a metal salt may be used as the ionic compound. Examples of the metal salt may include alkali metal cations or alkaline earth metal cations. Examples of the cations include one or at least two of lithium ions ($Li^+$), sodium ions ($Na^+$), potassium ions ($K^+$), rubidium ions ($Rb^+$), cesium ions ($Cs^+$), beryllium ions ($Be^{2+}$), magnesium ions ($Mg^{2+}$), calcium ions ($Ca^{2+}$), strontium ions ($Sr^{2+}$) and barium ions ($Ba^{2+}$), for example, one or at least two of lithium ions, sodium ions, potassium ions, magnesium ions, calcium ions and barium ions, or lithium ions may be used in view of ion stability and mobility.

Examples of the anion contained in the ionic compound include $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) and trispentafluoroethyl trifluorophosphate ($P(C_2F_5)_3F_3^-$).

In yet another embodiment, the anion of Chemical Formula 4 below or bisfluorosulfonylimide may be used as the anion.

$$[X(YO_mR_f)_n]^-$$  [Chemical Formula 4]

In Chemical Formula 4, X is a nitrogen atom or a carbon atom, Y is a carbon atom or a sulfur atom, $R_f$ is a perfluoroalkyl group, m is 1 or 2, and n is 2 or 3.

When Y in Chemical Formula 4 is carbon, m may be 1, when Y is sulfur, m may be 2, when X is nitrogen, n may be 2, and when X is carbon, n may be 3.

The anion of Chemical Formula 4 or bis(fluorosulfonyl)imide shows a high electronegativity due to a perfluoroalkyl group ($R_f$) or fluoro group, and also includes a specific resonance structure and forms a weak bond with cation while having hydrophobicity. Accordingly, the ionic compound can show superior compatibility with other components of the composition, such as the polymer, and can impart a high antistatic property even in small amount.

$R_f$ of Chemical Formula 4 may be a perfluoroalkyl group having 1 to 20 carbon atoms, 1 to 12 carbon atoms, 1 to 8 carbon atoms or 1 to 4 carbon atoms, and in this case, the perfluoroalkyl group may be a straight chain, branched chain or cyclic form. The anion of Chemical Formula 4 may be one or mixture of at least two of sulfonylmethide, sufonylimide, carbonylmethide or carbonylimide anions, in particular tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide or bispentafluoroethanecarbonylimide.

As the example of the ionic compound, an organic salt including, as a cation, a quaternary ammonium, such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium, pyridinium, imidazolium, pyrrolidinium or piperidinium, along with the anion component, may be used, and both the metal salt and the organic salt may be used as necessary.

The content of the ionic compound in the pressure sensitive adhesive composition is not particularly limited, and for example, may be a ratio of 0.01 to 5 parts by weight relative to 100 parts by weight of the polymer. The ratio of the ionic compound may be varied depending on the target antistatic property or the compatibility between the components.

The pressure sensitive adhesive composition may further include a silane coupling agent. Examples of the coupling agent include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxy silane, γ-acetoacetatepropyl triethoxy silane, β-cyanoacetyl trimethoxy silane, β-cyanoacetyl triethoxy silane, and acetoxyacetotrimethoxy silane, one or at least two of which may be used alone or in combination. For example, it may be preferable to use a silane coupling agent having an acetoacetate group or a β-cyanoacetyl group. The silane coupling agent may be included in an amount of 0.01 to 5 parts by weight or 0.01 to 1 part by weight relative to 100 parts by weight of the polymer in the pressure sensitive adhesive composition. If the content of the coupling agent is in the above range, the adequately increased effect of adhesion strength and endurance reliability may be ensured.

The pressure sensitive adhesive composition may further include a tackifying agent in view of controlling adhesion performance. As the tackifying agent, one or mixtures of at least two of a hydrocarbon resin or hydrogenated products thereof, a rosin resin or hydrogenated products thereof, a rosin ester resin or hydrogenated products thereof, a terpene resin or hydrogenated products thereof, a terpene phenol resin or hydrogenated products thereof, a polymerized rosin resin or a polymerized rosin ester resin may be used. The tackifying resin may be included in an amount of 1 to 100 parts by weight relative to 100 parts by weight of the copolymer. Within this content range, an appropriate enhancing effect of addition, compatibility and cohesive force may be secured.

The pressure sensitive adhesive composition may further include at least one additive selected from the group consisting of a compound which can form a coordinate bond with the antistatic agent, a photo-initiator, a multi-functional acrylate, an epoxy resin, a cross-linking agent, an ultraviolet light stabilizer, an antioxidant, a colorant, a reinforcing agent, a filler, an antifoaming agent, a surfactant and a plasticizer in a range without affecting the effect of the present application.

The pressure sensitive adhesive composition may have a low-speed peel strength of about 1 to 40 gf/25 mm, 1 to 30 gf/25 mm, 1 to 20 gf/25 mm or 1 to 10 gf/25 mm, and a high-speed peel strength of about 10 to 150 gf/25 mm or 10 to 100 gf/25 mm, over an adherent having a surface energy of 30 mN/m or less in a state in which a cross-linked structure is realized.

The term "low-speed peel strength" above may denote, for example, peel strength measured at a peel angle of 180 degrees and a peel rate of 0.3 m/min, and the high-speed peel strength may denote peel strength measured at a peel angle of 180 degrees and a peel rate of 30 m/min.

In particular, each peel strength may be measured at the above-described peel angle and peel rates after attaching the pressure sensitive adhesive composition in which a cross-linked structure is realized to the adherent having the surface energy of 30 mN/m or less, and maintaining it for 24 hours at 23° C. and relative humidity of 65%. The detailed method of measuring each peel strength will be explained in the following examples.

The method of measuring the surface energy of the adherent in the above is not particularly limited, and a known method of measuring surface energy may be applied. For example, the surface energy may be calculated from the measurement of a contact angle of the adherent, or may be measured using a known surface energy measurement apparatus. The surface energy of the adherent may be, for example, about 10 to 30 mN/m.

The pressure sensitive adhesive composition can also have a ratio (H/L) of the high-speed peel strength (H) to the low-speed peel strength (L) of 1 to 15, 5 to 15 or 7 to 13.

The pressure sensitive adhesive composition can also have a peel-off constant voltage of 0.5 kV or less measured at a peel angle of 180 degrees and a peel rate of 40 m/min over the adherent, i.e. an adherent having a surface energy of 30 mN/m or less in a state in which a cross-linked structure is realized. The method of measuring the peel-off constant voltage will be described in the following examples.

By ensuring the above-described low-speed peel strength, high-speed peel strength and/or peel-off constant voltage, an appropriate protection function over the adherent and easy and fast peeling may be obtained while minimizing the induction of static electricity, and the like.

The present application further relates to an adhesive sheet. An example of the adhesive sheet is a protective film, in particular a protective film for an optical film.

For instance, the adhesive sheet may be used as a protective film for an optical film, such as a polarizing plate, a polarizer, a protective film for a polarizer, a phase difference film, a viewing angle compensation film, and a brightness enhancement film. In the present specification, the term "polarizer" and the term "polarizing plate" denote different objects. In other words, a polarizer is a film, sheet or element showing a polarization function itself, while a polarizing plate is an optical film including the polarizer and other elements. Examples of the other elements which may be contained in the optical film with the polarizer include a protective film for a polarizer and a phase difference layer, but the present application is not limited thereto.

The adhesive sheet can, for example, include a base film for surface protection and an adhesive layer on one side of the base film. The adhesive layer can, for example, include the cross-linked pressure sensitive adhesive composition, i.e. a pressure sensitive adhesive composition in which a cross-linked structure is realized, as the pressure sensitive adhesive composition.

The pressure sensitive adhesive composition shows relatively high low-speed peel strength and relatively low high-speed peel strength after realizing a cross-linked structure, while possessing superior balance between both peel strengths, endurance reliability, workability, transparency and an antistatic property. Accordingly, the protective film may be effectively used as a surface protective film to protect surfaces of various optical devices and their parts, or display devices and their parts, such as optical films, including a polarizing plate, a phase difference plate, an optical compensation film, a reflective sheet and a brightness enhancement film for an LCD, but the application is not limited to the above-described protective film.

General films or sheets known in the art may be used as the base film for surface protection. Examples thereof include polyester films, such as polyethyleneterephthalate or polybutyleneterephthalate, and plastic films, such as a polytetrafluoroethylene film, a polyethylene film, a polypropylene film, a polybutene film, a polybutadiene film, a poly(chlorovinyl) film and a polyimide film. The film may be a single layer or be a laminate with at least two layers, and may further include a functional layer, such as an anticontaminant layer or an antistatic layer, as necessary. Also, the surface treatment, such as primer treatment, may be conducted on one side or both sides of the base in view of enhancement of base adhesion.

A thickness of the base film is not particularly limited, may be properly selected according to the application, and may be generally formed to a thickness of 5 to 500 µm or 10 to 100 µm.

A thickness of the adhesive layer contained in the adhesive sheet is not particularly limited, and may be, for instance, 2 to 100 µm or 5 to 50 µm.

The method for forming the adhesive layer is not particularly limited, and examples of such method include applying the pressure sensitive adhesive composition or the coating solution prepared therefrom to the base film by general means, such as a bar coater and curing, or applying the pressure sensitive adhesive composition or the coating solution to the surface of peelable base, curing and transferring to the base film again.

The formation process of the adhesive layer may be preferably performed after sufficiently removing bubble-inducing components, such as volatile components or reaction remaining within the pressure sensitive adhesive composition or the coating solution. Accordingly, issues such as decrease of modulus of elasticity due to low cross-link density or molecular weight of the adhesive, and in-situ formation of scatterer caused by a size increase of the bubbles existing between a glass plate and an adhesive layer at the high temperature may be prevented.

In addition, the method for curing the pressure sensitive adhesive composition in the above process is not particularly limited, and for example, an appropriate maturing process may be performed so as to react the polymer and the cross-linking agent contained in the composition, or photo-irradiation, for example ultraviolet irradiation, which can induce an activation of an inside photo-initiator, may be used.

The adhesive layer can, for example, have 80% to 99% of gel content. The gel content may be, for example, calculated with the following General Formula 4.

$$\text{Gel content} = B/A \times 100 \quad \text{[General Formula 4]}$$

In General Formula 4, A represents a mass of the adhesive, and B represents a dry mass of the insoluble recovered after depositing the adhesive in ethyl acetate at room temperature for 48 hours.

The present application also relates to an optical film. One illustrative optical film may include an optical device and the adhesive sheet attached to the surface of the optical device. For instance, the adhesive layer of the adhesive sheet may be attached to the surface of the optical device, and as such, the optical device may be protected by the base film for surface protection.

Examples of the optical device contained in the optical film include a polarizer, a polarizing plate, a protective film for a polarizer, a phase difference layer or a viewing angle compensation layer.

General types of polarizers known in the art, such as a polyvinyl alcohol polarizer, may be adopted as the polarizer in the above without any limitation.

The polarizer is a functional film or sheet that may extract only light vibrating in one direction from incident light vibrating in several directions. Such a polarizer may be, for example, in such a form that dichroic colors are adsorbed and aligned to a polyvinyl alcohol resin film. For example, the polyvinyl alcohol resin constituting the polarizer may be obtained by gelating a polyvinlyacetate resin. Herein, the polyvinylacetate resin which may be used may include a copolymer of vinyl acetate and other polymerizable monomers with vinyl acetate, as well as a homopolymer of vinyl acetate. In the above, examples of the polymerizable monomers with vinyl acetate include one or a mixture of at least two of unsaturated carboxylic acids, olefins, vinyl ethers, unsaturated sulfonic acids and acrylamides having an ammonium group, but the present application is not limited thereto. The degree of gelation of the polyvinyl alcohol resin may generally be 85 to 100 mol %, preferably at least 98 mol %. The polyvinyl alcohol resin may also be further modified, and for example, polyvinyl formal or polyvinyl acetal modified with aldehydes may also be used. In addition, the polymerization degree of the polyvinyl alcohol resin may generally be 1,000 to 10,000, preferably about 1,500 to 5,000.

The polyvinyl alcohol resin may be prepared into a film and used as a disk film of the polarizer. A method of forming a film from the polyvinyl alcohol resin is not particularly limited and general methods known in the art may be used. A thickness of the disk film formed with the polyvinyl alcohol resin is not particularly limited, and may be, for example, appropriately controlled in a range of 1 to 150 µm. The thickness of the disk film may be controlled in at least 10 µm, considering ease of stretching. The polarizer may be manufactured by processes of stretching the polyvinyl alcohol resin film as in the above (e.g. uniaxial stretching), dyeing the polyvinyl alcohol resin film with dichroic colors and adsorbing them thereto, treating the polyvinyl alcohol resin film with the adsorbed dichroic colors with a boric acid aqueous solution, and washing it with water after treating with the boric acid aqueous solution. As for the dichroic colors in the above, iodine or dichroic organic dyes may be used.

The polarizing plate can, for example, include a polarizer; and another optical film attached to one or both sides of the polarizer. Examples of the other optical film include the above-described protective film for a polarizer, a phase difference layer, a viewing angle compensation layer, and an anti-glare layer.

In the above, the protective film for a polarizer is conceptually distinguished from the aforementioned protective film including the adhesive layer. The protective film for a polarizer may be formed as a multi-layered film laminated with the protective film consisting of, for example, cellulose films such as triacetyl cellulose; acryl films; polyester films such as polycarbonate films or polyethyleneterephthalate films; polyethersulfone films; and/or polyolefin films such as polyethylene films, polypropylene films, or polyolefin films having a cyclo or norbornene structure or an ethylene propylene copolymer. A thickness of the protective film is not particularly limited either, and may be formed to a usual thickness.

A surface-treatment layer may be on the surface of the optical device to be protected by the protective film in the optical film. The surface-treatment layer can, for example, have a surface energy of 30 mN/m or less. In other words, the surface-treatment layer having surface energy of 30 mN/m or less may be formed on the surface of the optical device to be protected by the protective film in the optical film, and the adhesive layer of the protective film may be attached to the surface-treatment layer.

Examples of the surface-treatment layer include a high hardness layer, an anti-glare layer, such as an anti-glare (AG) layer or semi-glare (SG) layer and a low reflection layer, such as an anti-reflection (AR) layer or a low reflection (LR) layer.

The high hardness layer may be a layer having at least 1H or 2H pencil hardness under a load of 500 g. The pencil hardness may be measured, for example, using the pencil lead defined in KS G2603 according to ASTM D 3363 standard.

The high hardness layer may be, for example, a high hardness resin layer. The resin layer can include, for example, a room-temperature-curable, moisture-curable, thermo-curable or active-energy-ray-curable resin composition in a cured state. In a particular embodiment of the present application, the resin layer may include a thermo-curable or active-energy-ray-curable resin composition, or an active-energy-ray-curable resin composition in a cured state. "A cured state" in the explanation of high hardness layer may denote that a resin composition is transformed to a hard state through a cross-linking reaction or a polymerization reaction of the components contained in each resin composition. Also, the room-temperature-curable, moisture-curable, thermo-curable or active-energy-ray-curable resin composition in the above may denote a composition in which the cured state may be induced at room temperature, or under appropriate moisture, under thermal application or under irradiation with active energy rays.

Various resin compositions which can satisfy the above-described pencil hardness in the cured state are known in the art, and a person having ordinary skill in the art can easily select proper resin composition.

In one embodiment, the resin composition can include an acryl compound, an epoxy compound, a urethane compound, a phenol compound or a polyester compound as its main material. The "compound" in the above may be a monomeric, oligomeric or polymeric compound.

In one embodiment, an acryl resin composition having superior optical characteristics, such as transparency, and excellent resistivity to yellowing, such as an active-energy-ray-curable acryl resin composition, may be used.

The active-energy-ray-curable acryl composition can include, for example, an active-energy-ray-polymerizable polymer component and a reactive monomer for dilution.

Examples of the polymer component include components known as active-energy-ray-polymerizable oligomers, such as urethane acrylate, epoxy acrylate, ether acrylate and ester acrylate, or the polymerization products of mixtures including the monomers, such as a (meth)acrylic acid ester monomer. Examples of the (meth)acrylic acid ester monomer include an alkyl (meth)acrylate, a (meth)acrylate having an aromatic group, a heterocyclic (meth)acrylate or an alkoxy (meth)acrylate. Various polymer components for manufacturing active-energy-ray-curable composition are known in the art, and the compound above may be selected as necessary.

Examples of the reactive monomer for dilution which may be contained in the active-energy-ray-curable acryl composition include monomers having one or at least two active-energy-ray-curable functional groups, such as an acryloyl group or a methacryloyl group. For example, the (meth)acrylic acid ester monomer or multi-functional acrylate may be used as the reactive monomer for dilution.

The selection or the combining ratio of the selected components for manufacturing the active-energy-ray-curable acryl composition are not particularly limited, and may be controlled in view of the target hardness of the resin layer and other physical properties.

As for the anti-glare layer, such as the AG layer or SG layer, for example, a resin layer in which an uneven surface is formed or a resin layer including particles having a different refractive index from the resin layer may be used.

As for the resin layer above, for example, a resin layer used to form a high hardness layer may be used. In the case of forming the anti-glare layer, although it is not necessary to control the components of the resin composition so as to show high hardness, there is no harm in forming the resin layer to show high hardness.

The method of forming an uneven surface on the resin layer in the above is not particularly limited. For example, the uneven structure may be realized by curing the resin composition in a state in which the coating layer of the resin composition is in contact with a mold having the target uneven structure, or combining particles having appropriate particle size to the resin composition, coating and curing.

The anti-glare layer can also be realized using particles having a different refractive index from the resin layer.

In one embodiment, the difference of the refractive index between the particles and the resin layer may be, for example, 0.03 or less or 0.02 to 0.2. When the difference of the refractive index is too small, it is difficult to induce haze. On the other hand, when the difference is too large, haze may be increased by increasing generation of scattering within the resin layer, but a decrease of light transmittance or a contrast property may be induced, and thus the particles may be properly selected in view of this.

The shape of the particles to be contained in the resin layer is not particularly limited, and may be, for example, a sphere, an ellipsoid, a polyhedron, amorphous or another shape. The particles can have a particle diameter of 50 to 5,000 nm. In a yet another embodiment of the present application, particles having an uneven surface structure may be used as the particles. The particles may, for example, have an average surface roughness (Rz) of 10 to 50 nm or 20 to 40 nm, and/or a maximum height of the uneven surface structure may be about 100 to 500 nm or 200 to 400 nm, and a width between peaks may be 400 to 1,200 nm or 600 to 1,000 nm. Such particles have superior compatibility with the resin layer or a superior dispersibility in there.

Examples of the particles include various inorganic or organic particles. Examples of the inorganic particles include silica, amorphous titania, amorphous zirconia, indium oxide, alumina, amorphous zinc oxide, amorphous cerium oxide, barium oxide, calcium carbonate, amorphous barium titanate or barium sulfate, and examples of the organic particles include a cross-linked product or non-cross-linked product of organic materials, such as an acryl resin, a styrene resin, a urethane resin, a melamine resin, a benzoguanamine resin, an epoxy resin or a silicone resin, but the present application is not limited thereto.

The content of the uneven structure and the particles formed in the resin layer are not particularly limited. The shape of the uneven structure or the content of the particles may be, for example, controlled so that haze of the resin layer may be about 5% to 15%, 7% to 13% or about 10% in case of AG layer, or the haze may be about 1% to 3% in case of SG layer. The haze may be measured, for example, using a hazemeter, such as HR-100 or HM-150 available from Sepoong Corporation according to the manual of the manufacturer.

The low reflection layers, such as an AR layer or LR layer, may be formed by coating low reflective materials. Various low reflective materials are known for forming a low reflection layer, and these may be appropriately selected to be used in the optical device. The low reflection layer may be formed so that reflectivity may be about 1% or less through the coating of the low reflective material.

The materials disclosed in Korean Patent Application Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 or 2009-0049557 can also be used for the formation of the surface-treatment layer.

The surface-treatment layer may be formed singly, or as a combination of at least two. Examples of the combination include the case in which a high hardness layer is first formed on a surface of base layer, and the low reflection layer is formed on its surface.

The present application further relates to a display device, such as a liquid crystal display device (LCD). One illustrative display device can include a liquid crystal panel, and the optical film may be attached to one or both sides of the liquid crystal panel. The film may be, for example, attached to the liquid crystal panel using glue or an adhesive. The glue or adhesive is a glue or adhesive other than the adhesive in the above-described protective film.

Types of the liquid crystal panel contained in the liquid crystal display device are not particularly limited. For instance, any of various F passive matrix types including a twisted nematic (TN) type, a super twisted nematic (STN) type, a ferroelectric (F) type and a polymer dispersed (PD) LCD type; various active matrix types including a two terminal type and a three terminal type; and known liquid crystal panels including in-plane switching (IPS) mode panels and vertical alignment (VA) mode panels may be applied thereto. In addition, other components included in the liquid crystal display device are not particularly limited, and the method of preparing the same is not particularly limited either. General constitutions in this field may be selected and used without limitation.

Advantageous Effects

The pressure sensitive adhesive composition of the present application shows appropriate low-speed and high-speed peel strengths after formation of a cross-linked structure, as well as superior balance between the two. Accordingly, when the pressure sensitive adhesive composition is applied to a protective film, for example, a superior protection effect and easy peel-off upon high-speed peeling, which is also advantageous for a high-speed process, are obtained, and in addition, a superior antistatic property may be obtained during the process.

MODES OF THE INVENTION

The pressure sensitive adhesive composition will be described in detail with reference to Examples and Comparative Examples, but the range of the pressure sensitive adhesive composition is not limited to the following Examples.

1. Measurement of Low-Speed Peel Strength

The adhesive sheet prepared in Examples or Comparative Examples was attached with a 2 kg roller according to JIS Z 0237 to the surface-treatment layer of the polarizing plate on which the surface-treatment layer (anti-glare layer) having a surface energy of about 26 mN/m was formed. Then, it was stored at 23° C. under relative humidity of 65% for 24 hours, and then a specimen having a width of 25 mm and a length of 120 mm was prepared by cutting. Subsequently, the specimen was fixed on a glass substrate, and then a peel strength was measured while peeling the adhesive sheet from the surface-treatment layer along the width direction at a peel angle of 180 degrees and a peel rate of 0.3 m/min using a tension tester. For the peel strength, an average of the measured values for the two identical specimens was adopted.

2. Measurement of High-Speed Peel Strength

The adhesive sheet prepared in Examples or Comparative Examples was attached with a 2 kg roller according to JIS Z 0237 to the surface-treatment layer of the polarizing plate on which the surface-treatment layer (anti-glare layer) having a surface energy of about 26 mN/m was formed. Then, it was stored at 23° C. under relative humidity of 65% for 24 hours, and then the specimen having a width of 25 mm and a length of 250 mm was prepared by cutting. Subsequently, the specimen was fixed on a glass substrate, and then a peel strength was measured while peeling the adhesive sheet from the surface-treatment layer along the width direction at a peel angle of 180 degrees and a peel rate of 0.3 m/min using a tension tester. For the peel strength, an average of the measured values for the two identical specimens was adopted.

3. Measurement of Peel-Off Constant Voltage

A specimen identical to the one used for the low-speed or high-speed peel strength measurement, except that its width was 22 cm and its length was 25 cm, was prepared. Subsequently, the specimen was fixed on a glass substrate, and then a constant voltage was measured while peeling the adhesive sheet of the specimen at a peel angle of 180 degrees and a peel rate of 40 m/min using tension tester.

4. Generation of Stain after Removing Adhesive Sheet

Staining was assessed according to the following standard, after peeling the adhesive sheet off from the specimen identical to the one used in the low-speed peel strength measurement, to observe the occurrence of staining caused by static electricity in the surface of adherent.

<Assessment Standard>
○: No staining on the surface of the adherent
x: Staining on the surface of the adherent Preparation Example 1

Preparation of Acrylic Polymer (A)

93 parts by weight of 2-ethylhexyl acrylate (2-EHA), 1 part by weight of 4-hydroxybutyl acrylate, 2 parts by weight of 2-hydroxyethyl acrylate, and 6 parts by weight of polyethyleneglycol monomethylether methacrylate (addition of alkylene oxide unit: 2 to 8 mol) were introduced into a 1 L reactor refluxing nitrogen gas equipped with a cooling device for easy control of the temperature, and 100 parts by weight of ethyl acetate (EAc) was introduced as a solvent. Subsequently, the reactor was purged with nitrogen gas for 1 hour to remove oxygen, a reaction initiator (azobisbutyronitrile, AIBN) was introduced, and the reaction was conducted for 8 hours. After the reaction, the reaction product was diluted with EAc to obtain an acrylic polymer (A).

Preparation Examples 2 to 9

Preparation of Acrylic Polymer (B) to (I)

The polymers were prepared identically to the preparation example 1, except that the ratios of the used monomers were controlled as in the following table 1.

TABLE 1

| | Preparation example | | | | | | | | |
|---|---|---|---|---|---|---|---|---|---|
| | 1 | 2 | 3 | 4 | 5 | 6 | 7 | 8 | 9 |
| Polymer | (A) | (B) | (C) | (D) | (E) | (F) | (G) | (H) | (I) |
| EHA | 93 | 84 | 82 | 91 | 92 | 69 | 89 | 85 | 84 |
| HBA | 1 | 1 | 1 | 3 | 1 | 1 | 1 | — | 1 |
| HEA | 2 | 5 | 2 | 1 | 4 | 7 | — | 5 | 5 |
| AO | 6 | 10 | 15 | 5 | 3 | 23 | 10 | 10 | 10 |

Unit for monomer content: parts by weight
EHA: 2-ethylhexyl acrylate
HBA: 4-hydroxybutyl acrylate
HEA: 2-hydroxyethyl acrylate
AO: polyethyleneglycol monomethylether methacrylate (addition of alkylene oxide unit: 2 to 8 mol)

Example 1

Preparation of Pressure Sensitive Adhesive Composition 100 parts by weight of the acrylic polymer (A) of the preparation example 1, 4.5 parts by weight of the mixture of an isophorone diisocyanate cross-linking agent and hexamethylene diisocyanate cross-linking agent (available from Asahi, MHG-80B) as cross-linking agents, 0.3 g of lithium bis(trifluoromethanesulfonyl)imide (LiTFSi), and 0.5 parts by weight of polyethyleneglycol bis(2-hexanoate) were uniformly combined, and diluted to an appropriate concentration in view of a coating property to obtain a pressure sensitive adhesive composition.

Preparation of Adhesive Sheet

The obtained pressure sensitive adhesive composition was coated and dried on a side of a poly(ethylene terephthalate) (PET) film (thickness: 38 μm) to form a uniform coating layer having a thickness of about 20 μm. Subsequently, a cross-linked structure was realized in the coating layer of the composition by maintaining a temperature of about 50° C. for 48 hours to prepare the adhesive sheet.

Examples 2 and 3 and Comparative Examples 1 to 6

The pressure sensitive adhesive composition and the adhesive sheet were prepared identically to Example 1, except that the composition of the pressure sensitive adhesive composition was modified as in the following table 2.

TABLE 2

| | Example | | | Comparative Example | | | | | |
|---|---|---|---|---|---|---|---|---|---|
| | 1 | 2 | 3 | 1 | 2 | 3 | 4 | 5 | 6 |
| Polymer type | (A) | (B) | (C) | (D) | (E) | (F) | (G) | (H) | (I) |
| Polymer content | 100 | 100 | 100 | 100 | 100 | 100 | 100 | 100 | 100 |
| Cross-linking agent type | (A) | (A) | (A) | (A) | (A) | (A) | (A) | (A) | (B) |
| Cross-linking agent content | 4.5 | 4.5 | 4.5 | 4.5 | 4.5 | 4.5 | 4.5 | 4.5 | 4.5 |
| Antistatic agent content | 0.5 | 0.5 | 0.5 | 0.5 | 0.5 | 0.5 | 0.5 | 0.5 | 0.5 |

Unit for content: parts by weight
Cross-linking agent (A): mixture of aliphatic cyclic isocyanate cross-linking agent and aliphatic acyclic isocyanate cross-linking agent (available from Asahi, MHG-80B)
Cross-linking agent (B): aromatic isocyanate cross-linking agent (Coronate L)
Antistatic agent: LiTFSi (lithium bis(trifluoromethanesulfonyl)imide)

The results for measurement of physical properties of the adhesive sheet of the examples and Comparative Examples are summarized in the following table 3.

TABLE 3

In the case of Comparative Example 6, a viscosity of the pressure sensitive adhesive composition increased quickly before coating, and thus the preparation of the adhesive sheet was not possible.

| | Example | | | Comparative Example | | | | | |
|---|---|---|---|---|---|---|---|---|---|
| | 1 | 2 | 3 | 1 | 2 | 3 | 4 | 5 | 6 |
| Low-speed peel strength (gf/25 mm) | 4 | 4.5 | 2.5 | 0.6 | 5.0 | 0.6 | 0.8 | 5.5 | — |
| High-speed peel strength (gf/25 mm) | 90 | 75 | 60 | 20 | 158 | 10 | 20 | 155 | . |
| Peel-off constant voltage (kV) | 0.4 | 0.1 | 0.1 | 0.8 | 0.6 | 0 | 0.7 | 0.2 | — |
| Staining | ○ | ○ | ○ | x | ○ | ○ | x | ○ | — |

The invention claimed is:

1. A pressure sensitive adhesive composition, comprising:
a polymer that comprises, as polymerized units, a first monomer which is represented by the following Chemical Formula 1 and in which the total number of carbon atoms in the A and B of Chemical Formula 1 is not less than 1 and less than 3; a second monomer which is represented by the following Chemical Formula 1 and in which the total number of carbon atoms in the A and B of Chemical Formula 1 is not less than 3; and a compound represented by the following Chemical Formula 2, and that satisfies the General Formulae 1 to 3; and
a cross-linking agent including both an aliphatic cyclic isocyanate compound and an aliphatic acyclic isocyanate compound,
wherein the pressure sensitive adhesive composition includes the cross-linking agent in an amount of 4.5 to 10 parts by weight relative to 100 parts by weight of the polymer,
wherein a peel strength of the pressure sensitive adhesive composition, measured at a peel angle of 180 degrees and a peel rate of 30 m/min with respect to an adherent whose surface energy is 30 mN/m or less under a state where a crosslinking structure is formed is from 10 gf/25 mm to 150 gf/25 mm:

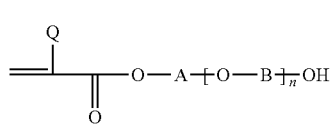

[Chemical Formula 1]

wherein Q is hydrogen or an alkyl group, A and B are each independently an alkylene group or an alkylidene group, and n is a number from 0 to 10,

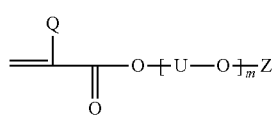

[Chemical Formula 2]

wherein Q is hydrogen or an alkyl group, U is an alkylene group or an alkylidene group, Z is an alkyl group or an aryl group, and m is a number from 1 to 20, $2 \leq O/P \leq 5$ [General Formula 1]

$O+P \leq X$ [General Formula 2]

1 weight % $\leq O+P+X \leq$ 18 weight % [General Formula 3]

wherein O is an amount by weight % of the first monomer in the polymer, P is an amount by weight % of the second monomer in the polymer, and X is an amount by weight % of the compound of Chemical Formula 2 in the polymer.

2. The pressure sensitive adhesive composition of claim 1, wherein the number m in the Chemical Formula 2 is from 4 to 8.

3. The pressure sensitive adhesive composition of claim 1, wherein the Q in the Chemical Formula 2 is an alkyl group having 1 to 4 carbon atoms.

4. The pressure sensitive adhesive composition of claim 1, wherein the aliphatic cyclic isocyanate compound is an isocyanate compound that is at least one selected from the group consisting of isophorone diisocyanate, methylene dicyclohexyl diisocyanate and cyclohexane diisocyanate; or a dimer or trimer of the isocyanate compound; or a reaction product of the isocyanate compound with a polyol.

5. The pressure sensitive adhesive composition of claim 1, wherein the aliphatic acyclic isocyanate compound is an alkylene diisocyanate compound having 1 to 20 carbon atoms; a dimer or trimer of the isocyanate compound; or a reaction product of the isocyanate compound with a polyol.

6. The pressure sensitive adhesive composition of claim 1, further comprising a metal salt.

7. The pressure sensitive adhesive composition of claim 1, of which a peel strength measured at a peel angle of 180 degrees and a peel rate of 0.3 m/min with respect to an adherent whose surface energy is 30 mN/m or less under a state where a crosslinking structure is formed is from 1 gf/25 mm to 40 gf/25 mm.

8. The pressure sensitive adhesive composition of claim 1, of which a peel-off constant voltage measured at a peel angle of 180 degrees and a peel rate of 40 m/min with respect to an adherent whose surface energy is 30 mN/m or less under a state where a crosslinking structure is formed is 0.5 kV or less.

9. A protective film, comprising:
a base film for surface protection; and
a pressure sensitive adhesive layer that is formed on one surface of the base film and that comprises a cross-linked product of the pressure sensitive adhesive composition of claim 1.

10. An optical film, comprising:
an optical device and
the protective film of claim 9 attached to a surface of the optical device.

11. The optical film of claim 10, wherein a surface-treatment layer whose surface energy is 30 mN/m or less is formed on a surface of the optical device, and the pressure sensitive adhesive layer of the protective film is attached on the surface-treatment layer.

12. The optical film of claim 11, wherein the surface-treatment layer is a high hardness layer, an anti-glare layer or a low reflection layer.

13. A display device comprising a liquid crystal panel on which the optical film of claim 10 is attached.

* * * * *